March 17, 1925.

T. MIDGLEY

TIRE BUILDING APPARATUS

Filed July 26, 1922

1,529,843

INVENTOR
Thomas Midgley
BY Edward C. Taylor
ATTORNEY

Patented Mar. 17, 1925.

1,529,843

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed July 26, 1922. Serial No. 577,679.

*To all whom it may concern:*

Be it known that I, THOMAS MIDGLEY, a citizen of the United States of America, residing at Hampden, in the county of Hampden and State of Massachusetts, have invented certain new and useful Improvements in Tire-Building Apparatus, of which the following is a specification.

This invention relates to improvements in methods of and apparatus for constructing tire casings, particularly to the operation of conforming to the sides of a convex core a layer of material which has been applied thereto. It is the object of the invention to apply this material more expeditiously and in a better manner than hitherto has been possible, and to provide an apparatus for the purpose which is rapid in action and inexpensive in construction.

The invention will be described in connection with the preferred embodiment illustrated in the accompanying drawing, in which—

Figure 1:
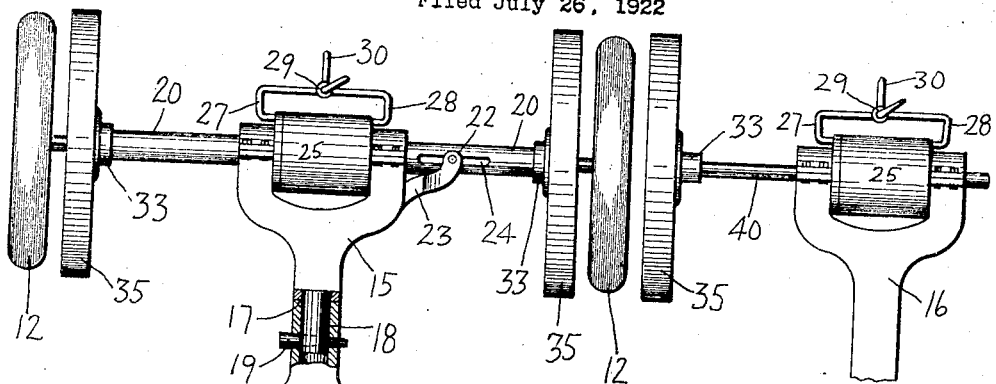
Fig. 1 is a side elevation, partly in section, showing the form of apparatus by which the invention may be carried into practice.

The first operation in applying material to a tire according to this invention is to stretch a strip of the material over the building core so that its natural tendency to revert to its unstretched form will cause the sides of the strip to extend practically straight in along the sides of the core. In speaking of material, I include any of the tire-building components which pass over the sides and crest of the tire, such as the fabric plies composing the carcass portion, or the tread rubber, with or without the side walls, cushion rubber, breaker strip, or chafing strip. In the drawings I have shown the invention as applied to the application of the tread and side walls 10 to a previously constructed carcass 11, shown as mounted on a core 12.

Figures 3, 4, 5:
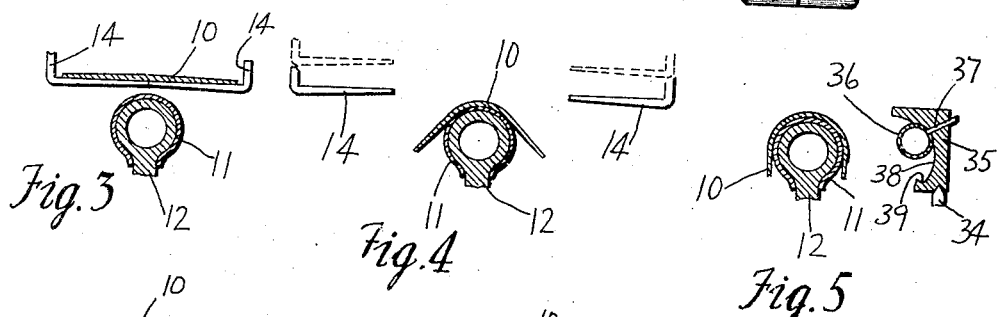
Fig. 3 is a diagrammatic illustration of one step in the application of an endless band to the core.
Fig. 4 shows a later stage.
Fig. 5 shows a still later stage.

Any suitable method or device may be employed in applying the material to the core. I prefer to use, however, the method and apparatus described in my Letters Patent No. 1,455,260, granted May 15, 1923. According to the disclosure therein, the material is first formed in an endless band of a circumference at least as small as the smallest circumference which any portion of the band is to assume in the built up tire. This band is then expanded by radially movable expander fingers, and taken from them by opposed sets of carrier fingers indicated in the accompanying drawings by 14. These fingers close together to receive the band from the expander fingers, and are then positioned over the core (Fig. 3) with the band of material centrally located around the core. The opposed series of fingers are then separated, causing the band to be released upon the core (Fig. 4). The carrier fingers have a slight motion away from the core so that they may clear its crest, as indicated in dotted lines. Due to the tendency of the rubber forming all or part of the band to revert to its unstretched condition, the sides of the band will contract through the position of Fig. 4 to that of Fig. 5, when they extend substantially straight down the sides of the core. These sides must now be pressed against the core, or the partially formed tire thereon, and, in case the core is of the usual type having its sides undercut, must be shaped to conform to these undercut sides.

In order to press the sides of the material against the core and conform it thereto, I employ an apparatus such as shown in the accompanying drawing. Described briefly, this apparatus comprises yieldable inflated bags, pressed by suitable means against the side of the core, and provided with suitable supporting and guiding means for the bags, whereby the pressure will cause them to be distorted so as to progressively conform to the contour of the core. This lays the material against the core in a progressive manner, avoiding danger of forming air pockets, and insuring an even lay of the material. The particular mechanism which I preferably employ for this purpose will now be described.

The apparatus is supported on pedestals 15 and 16. Pedestal 16 is of rigid construction, while pedestal 15 is divided into two parts at 17, with the upper part telescoping within the lower to permit of rotation of the upper portion. Suitable means may be provided if desired to hold the upper portion of the pedestal in fixed positions, such as a taper pin 19 passing through a taper hole in the telescoping parts of the two pedestal portions. Through the upper portion of the pedestal 15 passes a sleeve 20, and inside the sleeve a shaft 21 carrying the core 12. Shaft 21 is held stationary in the pedestal by a pin 22 attached to a bracket 23 and passing through a slot 24 in the sleeve. By this means the shaft is held stationary but the sleeve permitted a reciprocative motion. Midway of the pedestal is supported a cylinder 25 having a piston 26 thereon attached to the sleeve 20. Pipes 27 and 28 serve to admit or exhaust compressed air from the two ends of the cylinder. A valve 29 is operable to connect either end of the cylinder to a compressed air line 30 in the manner customary for double acting air cylinders.

Figure 6:
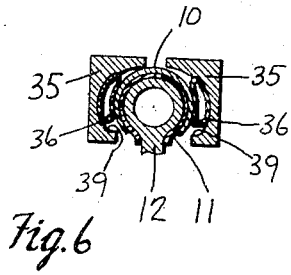
Fig. 6 shows a stage intermediate those shown in Figs. 5 and 2.
Figure 7:
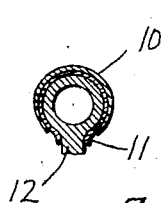
Fig. 7 is a cross-sectional detail of the tire showing the band completely applied.

On each end of shaft 21 is secured a chuck 31 of a type commonly used in supporting ring cores in tire building, having a plurality of centering pins 32 screwed therein and bearing on the inner periphery of the core. Secured on each end of sleeve 20 is a similar chuck 33, having pins 34 supporting a ring 35 which supports an air bag 36. As best shown in Fig. 5, the air bag 36 has an inflating tube 37 by which it may be initially inflated to the desired degree, and lies in a concave recess 38 in one face of the ring. This recess is shaped generally to conform to the core, or to the partially built tire thereon, but fits the tire closer at the crest than at the sides, so that as the ring is pressed against the core (Fig. 6) the tendency will be for the bag to be distorted towards the inner periphery of the core. Shoulders 39 prevent undue expansion of the bag in this direction.

Pedestal 16 carries no core, and only one ring 35, so that no sleeve is necessary, and a shaft 40 fixed to piston 26 is substituted therefor. The construction of the ring and bag is the same as in the case of those supported on pedestal 15, and the same reference numerals have been used in designating them.

Figure 2:
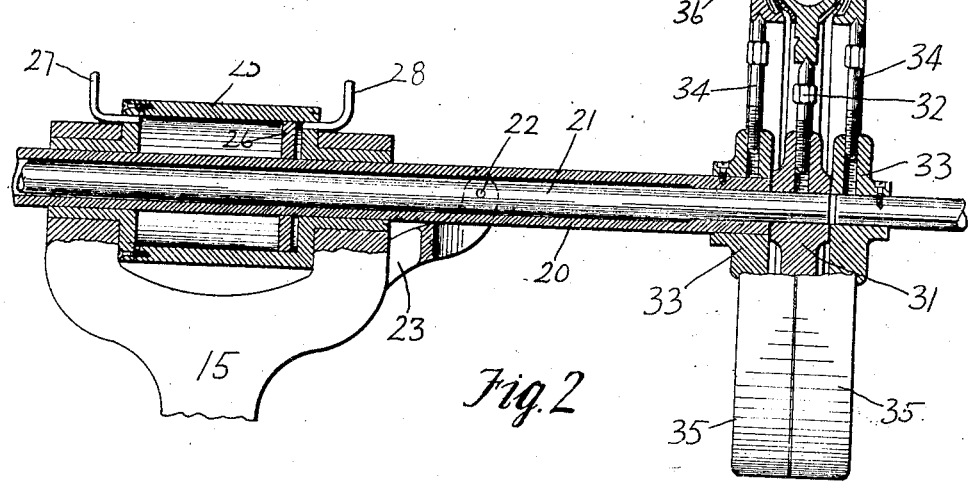
Fig. 2 is an enlarged detail thereof, partly in median section.

The operation of the apparatus, and the method employed therewith, will now be described. As previously stated, the endless band 10 is stretched from a circumference sufficiently less than the circumference of the crest of the core so that when it contracts its side portions will extend substantially straight inwardly (Fig. 5). The stretched band is then positioned about the core and released upon it, conveniently in the position of the core shown at the left in Fig. 1. The core with the contracted band thereon is then swung to the position of the core at the right in Fig. 1, and the pedestal locked in this position by pin 19. Air is admitted to each cylinder 25, preferably simultaneously, so that the rings 35 press and guide the bags 36 into contact with the inwardly extending side portions of the band 10. As the bag is pressed against the material at approximately the median line of the side of the core, it meets with the resistance offered by the core and distorts, flattening through the position of Fig. 6 to that of Fig. 2. Due to the shape of the recess 38 in the ring—which fits the tire closer at the crest than towards the beads—the bag will move towards the beads as it is progressively flattened, thus dragging the material down the sides of the core and pressing it into place.

This motion is obtained by the stretching of the bag material laterally as it is flattened by the pressure, and results in smoothing the material into place progressively and in a manner to avoid the formation of air pockets. If the material being applied is in the nature of the fabric or cord plies of the carcass, it may be anchored at the bases of the tire by any suitable bead construction. The addition of these, or other tire elements, may be accomplished in manners known in other forms of tire building, and need not be described further here.

Having thus described my invention, I claim:

1. In a tire building apparatus, a core, opposed ring members recessed to conform to the core, with more clearance adjacent the bead than adjacent the tread, inflated bags in the recesses, and means to press the rings and bags against the core, whereby the bags are distorted towards the bead portions of the core to smooth against the core tire building material laid thereon.

2. In a tire building apparatus, a core, opposed ring members recessed to conform to the core, with more clearance adjacent the bead than adjacent the tread, inflated bags in the recesses, means to press the rings and bags against the core, whereby the bags are distorted towards the bead portions of the core to smooth against the core tire building material laid thereon, and means to limit the distortion of the bag.

3. In a tire building apparatus, a core, a member recessed to conform to one side of the core, a permanently inflated bag in the recess, and means to move the member against the core, whereby the bag will be distorted into conformity with the core side.

4. In a tire building apparatus, a core, a member recessed to receive one side of the core, the member conforming to the core more closely at its crest than at its base, a permanently inflated bag in the recess, and means to move the member against the core, whereby the bag will be distorted into conformity with the core with a progressive action towards the base of the core.

THOMAS MIDGLEY.